United States Patent
Wang

(10) Patent No.: US 8,862,658 B2
(45) Date of Patent: Oct. 14, 2014

(54) METHOD AND APPARATUS FOR RECORDING AND REPLAYING NETWORK GAME

(75) Inventor: Chen Wang, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 947 days.

(21) Appl. No.: 12/254,522

(22) Filed: Oct. 20, 2008

(65) Prior Publication Data

US 2009/0048023 A1    Feb. 19, 2009

Related U.S. Application Data

(63) Continuation of application No. PCT/CN2007/001290, filed on Apr. 19, 2007.

(30) Foreign Application Priority Data

Apr. 19, 2006    (CN) .......................... 2006 1 0035154

(51) Int. Cl.
  *G06F 15/16* (2006.01)
  *A63F 13/30* (2014.01)
  *H04L 29/06* (2006.01)

(52) U.S. Cl.
  CPC ........... *A63F 13/12* (2013.01); *A63F 2300/634* (2013.01); *A63F 2300/5533* (2013.01); *H04L 67/38* (2013.01)
  USPC ........... 709/203; 709/201; 709/202; 709/227; 709/228; 709/229; 709/250

(58) Field of Classification Search
  USPC .......................... 709/227–229, 201–203, 250; 463/39–42
  See application file for complete search history.

(56) References Cited

U.S. PATENT DOCUMENTS

| | | | | |
|---|---|---|---|---|
| 5,586,257 A | * | 12/1996 | Perlman | 463/42 |
| 5,586,937 A | * | 12/1996 | Menashe | 463/41 |
| 5,956,485 A | * | 9/1999 | Perlman | 709/204 |
| 6,134,590 A | * | 10/2000 | Perlman | 709/228 |
| 6,835,137 B1 | * | 12/2004 | Nakamura | 463/42 |

(Continued)

FOREIGN PATENT DOCUMENTS

| | | |
|---|---|---|
| CN | 1517935 | 8/2004 |
| EP | 0 715 869 | 6/1996 |

OTHER PUBLICATIONS

International Search Report for Application No. PCT/CN2007/001290, dated Aug. 2, 2007.

*Primary Examiner* — Edward Kim
(74) *Attorney, Agent, or Firm* — Marshall, Gerstein & Borun LLP

(57) ABSTRACT

Embodiments of the present invention provide a method for recording and replaying a network game. The method includes copying all game messages sent by a game server to a game client during a game process; replaying the game process according to the copied game messages. Besides, embodiments of the present invention also provide an apparatus for recording and replaying a network game. In accordance with the method and apparatus in the embodiments of the present invention, unlike the prior art, the technical solution of recording and replaying a network game is independent of the network game itself and is dependent on the game messages sent by the game server. Therefore, the technical solution in the embodiments of the present invention can be used commonly for recording and replaying to all kinds of network games.

3 Claims, 4 Drawing Sheets

(56) References Cited

U.S. PATENT DOCUMENTS

| | | | |
|---|---|---|---|
| 7,214,133 B2* | 5/2007 | Jen et al. | 463/42 |
| 7,446,772 B2* | 11/2008 | Wong et al. | 345/473 |
| 7,610,402 B2* | 10/2009 | Van Datta | 709/238 |
| 2001/0031657 A1* | 10/2001 | White | 463/11 |
| 2002/0032056 A1* | 3/2002 | Oh | 463/42 |
| 2003/0003997 A1* | 1/2003 | Vuong et al. | 463/42 |
| 2003/0088644 A1* | 5/2003 | Ganguly et al. | 709/218 |
| 2004/0224741 A1* | 11/2004 | Jen et al. | 463/6 |
| 2005/0086287 A1* | 4/2005 | Datta | 709/201 |
| 2006/0068870 A1* | 3/2006 | Crawford et al. | 463/13 |
| 2006/0148571 A1* | 7/2006 | Hossack et al. | 463/43 |
| 2006/0287066 A1* | 12/2006 | Crawford et al. | 463/25 |
| 2006/0287101 A1* | 12/2006 | Crawford et al. | 463/42 |
| 2006/0287104 A1* | 12/2006 | White et al. | 463/42 |
| 2007/0129129 A1* | 6/2007 | Tinghitella | 463/13 |
| 2008/0244461 A1* | 10/2008 | Kropivny | 715/856 |
| 2009/0280905 A1* | 11/2009 | Weisman et al. | 463/40 |

* cited by examiner

METHOD AND APPARATUS FOR RECORDING AND REPLAYING NETWORK GAME

FIELD OF THE INVENTION

The present invention relates to network game technologies, and more particularly, to a method and an apparatus for recording and replaying a network game.

BACKGROUND OF THE INVENTION

A network game, which is a so-called online game, is a computer game on the Internet which allows multiple players at the same. The multiple players may enjoy communications, entertainments and leisure by communicating with each other. The network game mainly includes the following categories: chess and card games, intelligence facilitating games, athletics games, etc. During a network game, a game player may enjoy pleasure of playing games repeatedly through re-forming game scenes. Especially in the athletics games, an ordinary player may improve his game skills by watching and emulating how a highly skilled player plays the games. And subsequently, a technology of recording and replaying a network game emerges as the times require. By adopting the technology of recording and replaying the network game, a player may record a game process of the player and watch the record.

In the conventional technology of recording and replaying the network game, a basic principle is to sequentially record events occurred during the game process. For example, with respect to the chess games, the events occurred during the game process refer to placing down chessmen; with respect to card games, the events occurred during the game process refer to getting cards and showing cards; with respect to the athletics games, the events occurred during the game process refer to actions.

Taking a method of recording and replaying an I-go game as an example, each time a player places down a chessman, color of the chessman and values of coordinates of the chessman located at a chessboard are recorded. When the record is being played, according to a sequence of saving record information, the color of the chessman and the location of the chessman indicated in each piece of the record information are shown in the chessboard one by one. However, if the method of recording and replaying the I-go game is to be applied to a Chinese chess game, the method can not be applied to the Chinese chess game at all because the chessboard of the I-go game is different from that of the Chinese chess game.

As can be seen from the above description of the conventional recording and replaying technology, the conventional recording and replaying technology mainly depends on characteristics of a certain game, which makes a recording and replaying technology for a game can not be used universally for other games.

SUMMARY OF THE INVENTION

Embodiments of the present invention provide a method for recording and replaying a network game, which is a universal method for recording and replaying a network game.

A technical solution of the present invention is implemented as follows.

A method for recording and replaying a network game includes:

copying all game messages sent by a game server to a game client during a game process; and replaying the game process according to the copied game messages.

Embodiments of the present invention also provide an apparatus for recording and playing a network game, which may be commonly used for any network game for recording and replaying a network game.

A technical solution of the present invention is implemented as follows.

An apparatus for recording and replaying a network game includes a message engine module, a replaying control module and a game client; the message engine module is configured to copy all game messages sent by a game server to the game client during a game process;

the replaying control module is configured to send the game messages copied by the message engine module to the game client; and the game client is configured to replay the game process by executing the game messages received from the replaying control module.

Embodiments of the present invention provide a method for recording and replaying a network game, in which all the game messages sent by the game server to the game client during the game process are copied, and the game process is thus replayed according to the copied game messages. In the technical solution provided by the embodiments of the present invention, replaying the game process by the game client is determined by the game messages sent by the game server instead of the network game itself as the prior art, and therefore, the technical solution may be commonly used for recording and replaying varieties of network games.

BRIEF DESCRIPTION OF THE DRAWINGS

In order to make those skilled in the art understand the technical solutions and advantages of the present invention more clearly, embodiments of the present invention are hereinafter described in detail with reference to the accompanying drawings.

EMBODIMENTS OF THE INVENTION

In the technical solution provided by embodiments of the present invention, in view of the fact that a game process shown to a game client during a network game is driven and determined by game messages sent by a game server to the game client, it is only necessary to copy all the game messages sent by the game server to the game client during the game process, and then the game process may be replayed based on the copied game messages. The technical solution provided by the embodiments of the present invention may be used universally to all kinds of network games because it does not depend on characteristics of a game, which is different from the conventional technical solution.

Figure 1:
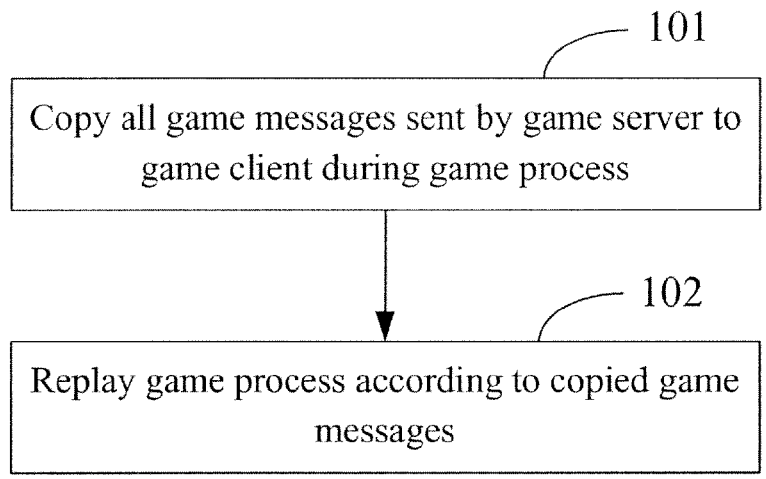
FIG. 1 is a flowchart illustrating a method in accordance with an embodiment of the present invention.

FIG. 1 is a flowchart illustrating a method in accordance with an embodiment of the present invention. As shown in FIG. 1, the method includes: Block 101 in which all game messages sent by a game server to a game client are copied during a game process; and Block 102 in which the game process is replayed according to the copied game messages.

Figure 2:
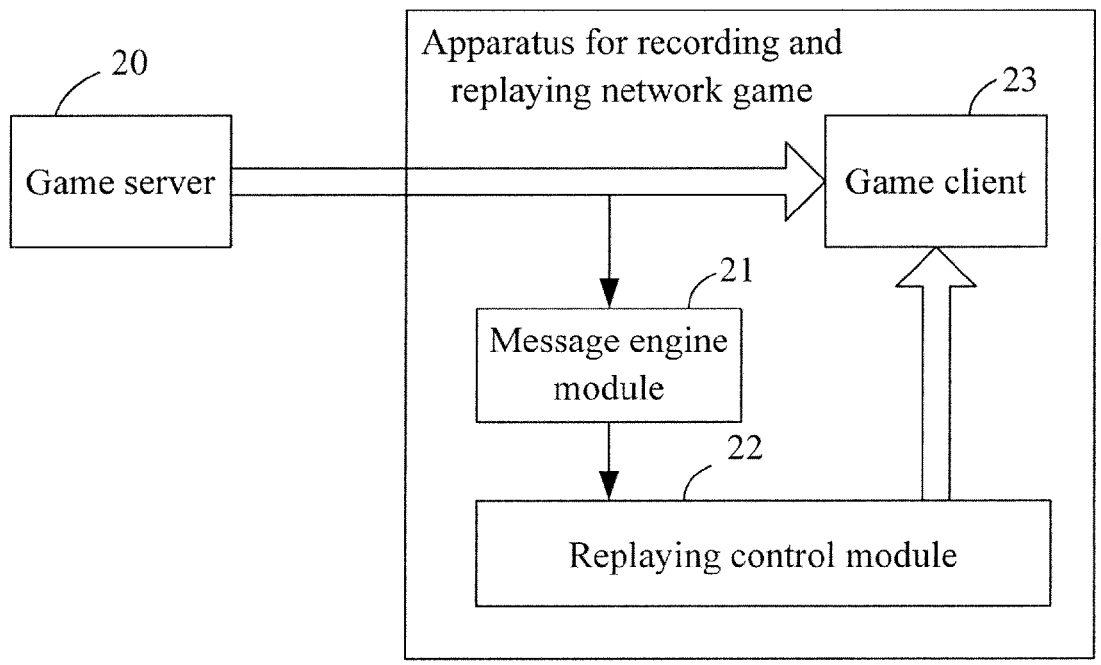
FIG. 2 is a schematic diagram illustrating a structure of an apparatus in accordance with an embodiment of the present invention.

FIG. 2 is a schematic diagram illustrating a structure of an apparatus in accordance with an embodiment of the present invention. As shown in FIG. 2, the apparatus includes: a message engine module 21, a replaying control module 22 and a game client 23. The message engine module 21 is mainly configured to copy all the game messages sent by a game server 20 to the game client 23 during a game process. The replaying control module 22 is mainly configured to send the game messages copied by the message engine module 21 to the game client 23. The game client 23 is mainly configured to replay the game process by executing the game messages.

The technical solution is hereinafter described in detail in accordance with two embodiments of the present invention.

Figure 3:
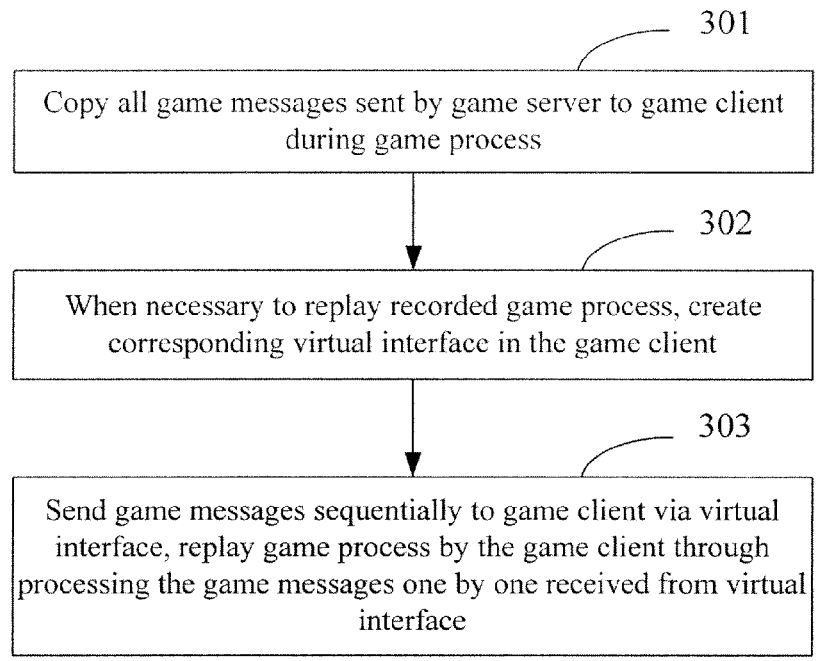
FIG. 3 is a flowchart illustrating a method in accordance with a first preferred embodiment of the present invention.

FIG. 3 is a flowchart illustrating a method in accordance with a first preferred embodiment of the present invention. As shown in FIG. 3, the method includes the following.

In Block 301, all game messages sent by a game server to a game client during a game process are copied.

In this Block, the process of copying may start at the time when the game client initiates a game, and stop at the time when the game client terminates the game. Of course, only a valuable game process is recorded so as to reduce a storage space for storing the game messages. Alternatively, the process of copying may start and/or stop according to an instruction of the game client. Actually, the process of copying the game messages is the process of recording a game.

The process of copying all the game messages sent by the game server during the game process may be achieved by adopting an interface provided by a message engine encapsulated in a Dynamic Link Library (DLL). The DLL may be pre-configured and set in an entity for copying all the game messages, so that the DLL may be invoked during the process of copying.

In Block 302, if the recorded game process need be replayed, a corresponding virtual interface is created in the game client according to an interface between the game server and the game client during the game process.

If the interface via which the game server and the game client communicates with each other includes: a game logic message transmitting interface, a common game message transmitting interface as well as a chat message transmitting interface, the virtual interface created in the game client also belongs to the above three types of interfaces accordingly.

The game client mentioned in the embodiment of the present invention refers to clients corresponding to different games, such as a game client corresponding to Chinese chess, a game client corresponding to cards as well as a game client corresponding to mah-jong. Component Class Identifier (CLSID) is the unique identifier corresponding to each client. Therefore, during the process of copying the game messages, the CLSID of a corresponding game client may be recorded. In this Block, when it is necessary to replay the recorded game process, the corresponding game client may be found according to the CLSID.

In Block 303, according to a sequence of receiving the game messages by the game client from the game server, the game messages copied are sent to the game client sequentially via the virtual interface created, so as to imitate a communication process between the game server and the game client. The game client processes the game messages received from the virtual interface one by one, so as to implement replaying the game process.

Similar to the case in Block 302, if there are multiple interfaces between the game client and the game server, a game message needs to be analyzed before being sent to the game client so as to determine the corresponding interface of the game message, and then the game message will be sent to the game client via the corresponding virtual interface. During the process of copying the game messages in Block 301, if a game message fails to record a corresponding interface of the game client, the interface used by the game message during the game process may be recorded when the game message is copied, so that a corresponding interface of the game message is determined.

To ensure replaying the game process recorded previously, it is necessary to process the game messages according to a sequence of receiving the game messages by the game client. Herein, when the game messages are copied, the game messages may be saved according to a sequence of sending the game messages by the game server. In this Block, the saved game messages are processed sequentially according to the principle of First Input First Output (FIFO). Although replaying the game process may be realized according to the principle of the FIFO, the replaying process cannot totally demonstrate the original game process because the game messages are not processed according to the time when the game messages are received by the game client from the game server. For example, in the original process of a mah-jong game, a current player will get a card about half a minute later after a previous player shows a card. According to the principle of the FIFO, if an interval of processing a game message is 1 second, there will be no pause of the above half a minute in the replayed game process. In the replayed game process, the current player gets a card about 1 second later after the previous player shows a card.

To demonstrate the original game process in the aspect of time, a timer circulation may be created, and the game messages will be processed utilizing a timer and according to a time-stamp carried in each game message. If a game message fails to carry a time-stamp, the time-stamp may be indicated for the game message during the process of copying the game message. Although the original game process may be demonstrated by processing the game messages according to time-stamps carried in the game messages, some game players may not need to know the redundant waiting, and in this case, a replaying mechanism without the time-stamps may be adopted.

Meanwhile, considering that the purpose of recording and replaying a game process is to learn experience from former game processes. Therefore, in this Block, processing of each game message may be triggered by a game player. During the process of replaying, each time one trigger instruction is received from a game player, one game message will be processed according to the sequence of receiving the game messages from the game server.

As can be seen from the above, different processing of the game messages may achieve different effect. Therefore, before a game process is replayed, options are provided for a game player wishing to watch the game process and a specific replaying mode is determined by the game player. Of course, this may also be achieved by controlling speed and location of a message flow when replaying the game process, or replaying the game process at a rate of n times of an original rate arbitrarily, or directly locating and replaying a certain segment of the recorded game process.

Besides, in the first preferred embodiment of the present invention, the game messages copied in Block 301 may be saved as a game recording file, and a file category of the game recording file may be set for examples as *.qrr. Operations in Blocks 302 and 303 may form a replaying control module; and an associated opening mode of the *.qqr file may be registered in a Register of a user client where the game client is located as follows: opening by the replaying control module. The user client may be a Personal Computer (PC) used by a game player. When the game player initiates files of this kind, i.e. when the recorded game process need be replayed in Block 302, according to the associated opening mode registered in the Register of the user client, the replaying control module will be automatically invoked to perform Blocks 302 and 303 in FIG. 3, so that the game process recorded in the file is replayed. The process of registering the associated opening mode for the *.qrr file in the Register may be implemented while installing the game client. The game player initiating the game recording file refers to double click of the file in the PC.

When it is necessary to find a corresponding game client according to the CLSID, the *.qrr file may be formed by the CLSID and the copied game messages. Subsequently, the corresponding game client may be found only according to the CLSID contained in the file when the replaying control module is invoked.

The copied game messages may be encrypted so as to ensure security of the recorded game process. Meanwhile, the copied game messages may be compressed so as to save a disk space for saving files.

Figure 4:
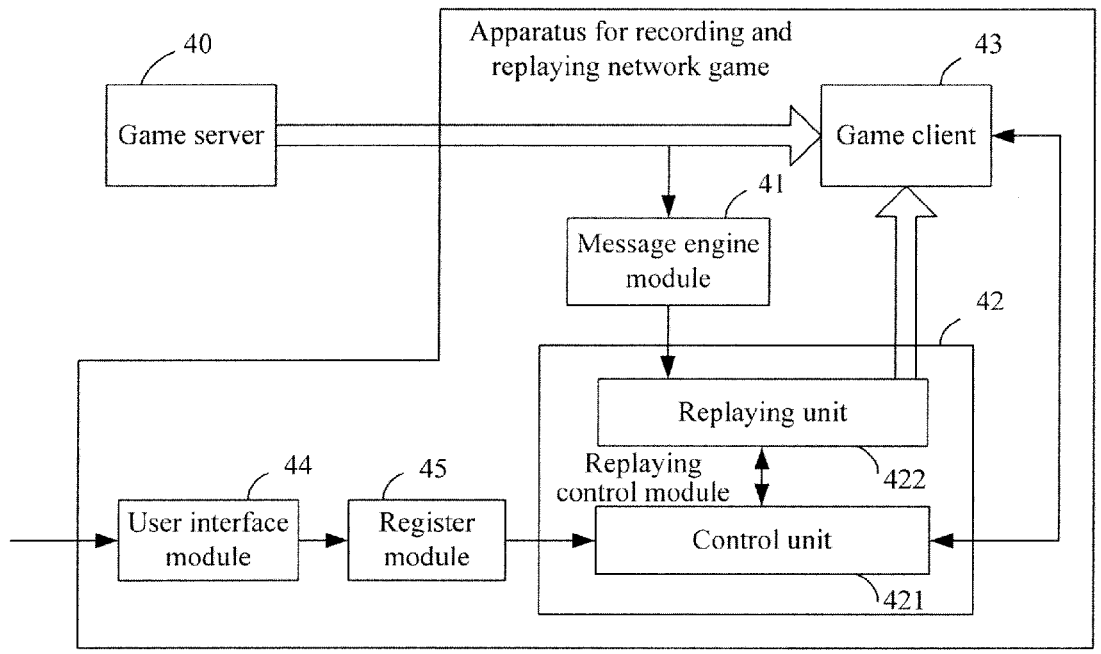
FIG. 4 is a schematic diagram illustrating a structure of an apparatus in accordance with the first preferred embodiment of the present invention.

FIG. 4 is a schematic diagram illustrating a structure of an apparatus in accordance with the first preferred embodiment of the present invention. As shown in FIG. 4, the apparatus includes: a message engine module 41, a replaying control module 42 and a game client 43. The replaying control module 42 further includes a control unit 421 as well as a replaying unit 422.

The message engine module 41 is mainly configured to copy all game messages sent by a game server 40 to the game client 43 during a game process. The control unit 421 is mainly configured to create a corresponding virtual interface between the replaying unit 422 and the game client 43 according to an interface between the game server 40 and the game client 43 during the game process. The replaying unit 422 is mainly configured to send, according to a sequence of receiving the game messages by the game client 43, the game messages copied by the message engine module 41 to the game client 43 via the virtual interface created by the control unit 421. Furthermore, the control unit 421 may create the virtual interface between the replaying unit 422 and the game client 43 via a Common Object Mode (COM) connection therebetween. For example, the above virtual interface may include a game logic message transmitting interface, a common game message transmitting interface as well as a chat message transmitting interface.

Besides, the apparatus may further include: a user interface module 44 and a Register module 45. The user interface module 44 is mainly configured to receive an instruction indicating replaying the game process, and to transmit the received instruction to the Register module 45. The Register module 45 is mainly configured to register the replaying control module 42 performing the replaying, and is configured to trigger the replaying control module 42 to perform the replaying according to the instruction received.

The specific operations performed by each module or each unit of the apparatus in the first preferred embodiment of the present invention, may refer to related descriptions of the method in the first preferred embodiment of the present invention, and no further description is given hereinafter.

In the technical solution provided by the first preferred embodiment of the present invention, the game process may be replayed according to the game messages sent by the game server to the game client. Therefore, by adopting the technical solution provided by the first preferred embodiment of the present invention, although the game process performed by the game player in the game client may be replayed, the original game process cannot be demonstrated completely. For example, in the mah-jong game having four players, when a game player is in the game, card information of the game player will be shown instead of card information of the other three players. In the technical solution in the first preferred embodiment of the present invention, since the game messages sent by the game server fail to carry card information of the other players, only card information of the player himself will be shown in the replayed game process, and card information of the other players will not be shown. Therefore, by adopting the technical solution provided by the first preferred embodiment of the present invention, the original game process may be replayed, however, the original game process cannot be demonstrated completely.

Figure 5:
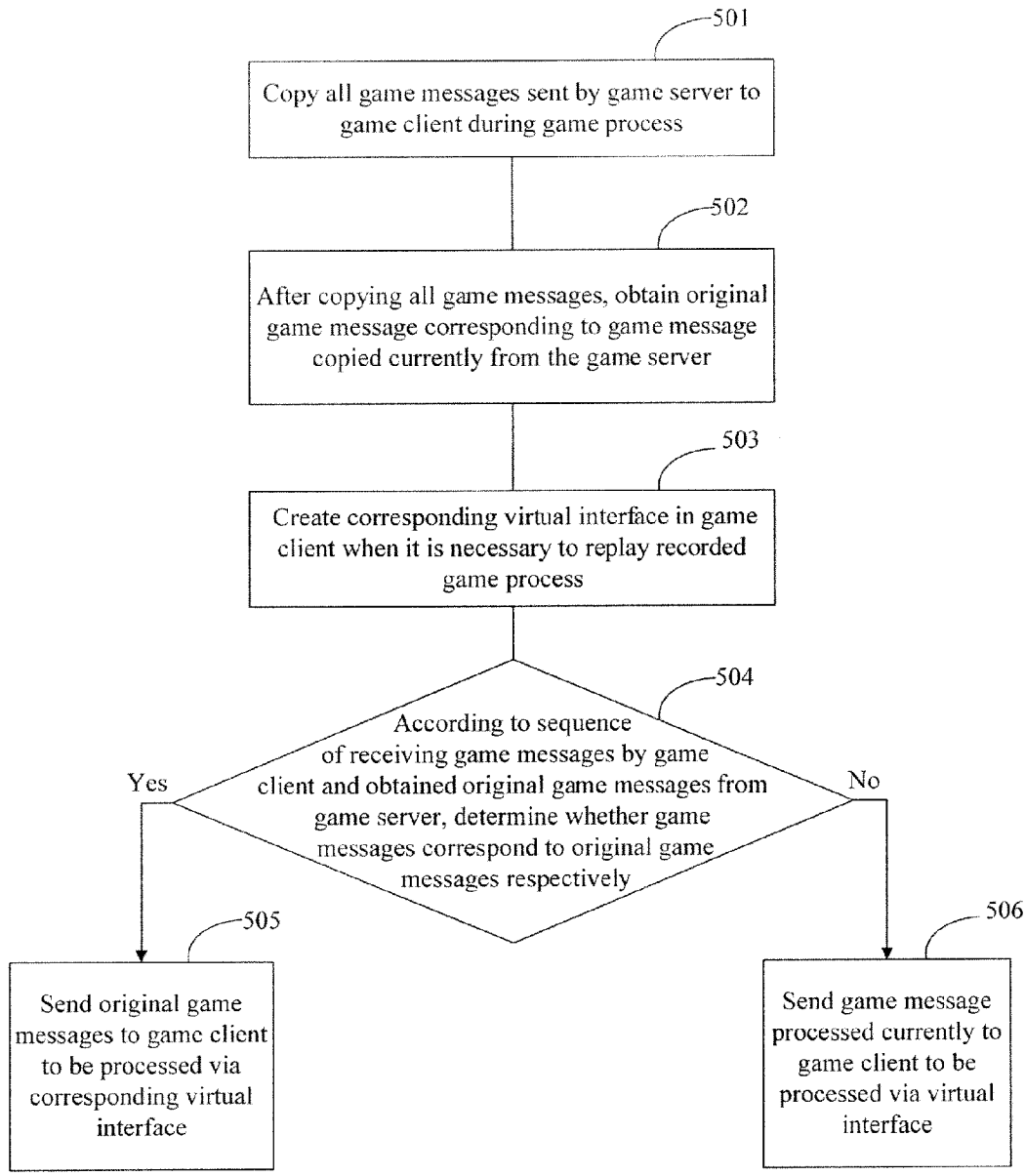
FIG. 5 is a flowchart illustrating a method in accordance with a second preferred embodiment of the present invention.

FIG. 5 is a schematic diagram illustrating a method in accordance with a second preferred embodiment of the present invention. As shown in FIG. 5, by adopting the method provided by the second preferred embodiment of the present invention, the original game process not only may be replayed, but also may be disclosed completely to game players.

During the game process, as to a game message carrying implicit information, the original game message carrying the implicit information will be sent by the game server only to a game client it destined to. A mirror game message without the implicit information, which is corresponding to the original game message, will be sent to the other game clients.

Likewise, the mah-jong game with four players will be taken as an example, and descriptions will be given in the following. Supposing that, the four game clients currently in the mahjong game are respectively A, B, C and D. A game message indicating the game client A to get a card is the current game message necessary to be sent by the game server. According to a game rule of the mahjong game with four players, the cu rrent game message indicating the game client A to get a card is only visible to player A of the game client A, and is invisible to the other game clients. Therefore, the game client A is the current game client of the original game message indicating the game client A to get a card. At this moment, it is necessary for the game server to send the original game message carrying the card information to the game client A, i.e. the original game message carrying the implicit information. Meanwhile, the mirror game message without the card information is sent to the other game clients. Correspondingly, after receiving the original game message, the game client A will display that the game client A has got a card with specific card information. After receiving the mirror game message, the other game clients will display that the game client A has got a card without specific card information.

As can be seen, each mirror game message received by the other game clients corresponds to an original game message. Therefore, compared with the first preferred embodiment, in the technical solution provided by the second preferred embodiment, an original game message carrying implicit information is further sent to a game client, and the original game process may be disclosed to the game player of the game client according to the copied game messages during the game process and the original game message sent by the game server. The specific flowchart is as follows.

In Block 501, operations are similar to that in Block 301 in the first preferred embodiment, thus no more descriptions are given herein.

In Block 502, after the game messages are copied during the game process, original game messages corresponding to the game messages copied currently are obtained from the game server.

In this Block, obtaining the original game messages may be triggered by sending a request to the game server after the game messages are copied. However, this does not indicate the termination of the current game. Likewise, obtaining the original game messages may also be actively triggered by the game server itself after the game client terminates the game.

Besides, based on the above description of the original game message, it can be seen that not all the game messages are mirror messages and have corresponding original game messages. Only when a game message contains implicit information, the game message has its corresponding original game message, e.g. a game message indicating an opposite player to get a card. Therefore, the original game messages sent by the game server may include the original game messages used in a period from the time the game starts to the time a request is received by the game server. Alternatively, according to time parameters carried in the request, i.e. the time to start copying and the time to stop copying, the original game messages sent by the game server may also include the original game messages used in a period from the time to start copying to the time to stop copying. Or, the original game messages sent by the game server may include all the original game messages used during the whole game process after the game is terminated.

In Block 503, the operations are similar to those in Block 302 described in the first preferred embodiment, thus no more descriptions are given herein.

In Block 504, according to a sequence of receiving the game messages by the game client from the game server and the original game messages obtained from the game server in Block 502, it is determined whether a game message processed currently corresponds to an original game message. If the game message processed currently corresponds to an original game message, Block 505 is performed. Otherwise, Block 506 is performed.

In Block 505, the game message processed currently is replaced by the corresponding original game message, and the corresponding original game message is sent via a corresponding virtual interface to the game client to be processed, so that the communication process between the game server and the game client is simulated.

In Block 506, the game message processed currently is sent via a corresponding virtual interface to the game client to be processed, so that the communication process between the game server and the game client is simulated.

The game client sequentially processes the game messages received from the virtual interfaces one by one, so as to implement replaying the game process.

In Blocks 505 and 506, the specific operations of sending the original game message or the game message to the game client may refer to descriptions in Block 303 in the first preferred embodiment, and no more descriptions are given herein.

Besides, the operation of saving the copied game messages as one file which is then opened by the replaying control module in the first preferred embodiment is also applicable to this embodiment, and thus no more detailed descriptions are given herein. Compared with the first preferred embodiment, this embodiment differs in that the copied game messages may be saved as a game recording file, or the copied game messages as well as subsequently obtained original game messages may be saved as a game recording file. The specific operations in this embodiment cannot be influenced by a specific saving mode.

Figure 6:
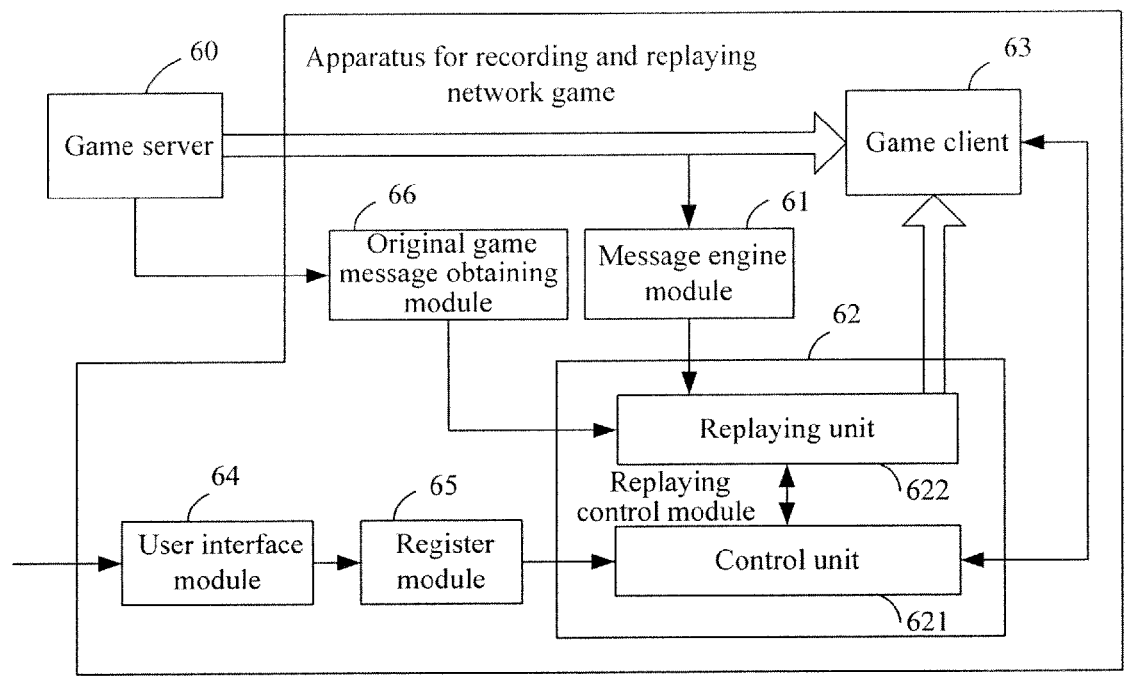
FIG. 6 is a schematic diagram illustrating a structure of an apparatus in accordance with the second preferred embodiment of the present invention.

FIG. 6 is a schematic diagram illustrating a structure of an apparatus in accordance with the second preferred embodiment of the present invention. The apparatus includes: an original game message obtaining module 66, a message engine module 61, a replaying control module 62 and a game client 63. The replaying control module 62 includes: a control unit 621 as well as a replaying unit 622.

The message engine module 61 is mainly configured to copy all the game messages sent by a game server 60 to the game client 63 during a game process. The original game message obtaining module 66 is mainly configured to obtain corresponding original game messages from the game server 60 during the game process. The control unit 621 is mainly configured to create corresponding virtual interfaces between the replaying unit 622 and the game client 63 according to interfaces between the game server 60 and the game client 63 during the game process. The replaying unit 622 is configured to send game messages one by one to the game client 63 via the created virtual interfaces according to a sequence of receiving the game messages by the game client 63 from the game server 60. When a game message is sent to the game client 63, the replaying unit 622 is configured to send a corresponding original game message to the game client 63 if the game message corresponds to the original game message according to the corresponding original game messages obtained by the original game message obtaining module 66; and to send the game message to the game client 63 if the game message does not correspond to an original game message. The control unit 621 may create the virtual interfaces between the replaying unit 622 and the game client 63 via a COM connection therebetween. The virtual interfaces may include a game logic message transmitting interface, a common game message transmitting interface as well as a chat message transmitting interface.

Besides, similar to the apparatus in the first preferred embodiment, the apparatus in the second preferred embodiment may further include a user interface module 64 and a Register module 65. The user interface module 64 is mainly configured to receive an instruction indicating replaying the game process, and send the instruction received to the Register module 65. The Register module 65 is mainly configured to register the replaying control module 62 performing a replaying process, and is configured to trigger the replaying control module 62 to replay the game process according to the instruction received.

The specific operations performed by each module or each unit in the apparatus in the second preferred embodiment of the present invention may refer to related descriptions of the method in the second preferred embodiment of the present invention, and no more descriptions are given herein.

The message engine module, the replaying control module, the original game message obtaining module, the user interface module and the Register module in the second preferred embodiment of the present invention may be located in a user client of the game client, or in the game server or in a third party server providing a function of game recording and replaying. Certainly, according to practical applications, these modules may also be respectively located in different network entities. For example, the message engine module may be located in a game server side, and the replaying control module may be located in the user client of the game client.

In the technical solution provided by embodiments of the present invention, because of characteristics that all events shown by the network game are driven by messages sent by the game server, all the game messages sent by the game server to the game client during the game process are copied and the copied game messages are sent again to the game client to be processed so as to realize the objective of replaying the game process. Because the technical solution provided by the embodiments of the present invention does not depend on the characteristics of each game, which is different from the conventional technical solution, but takes the common game messages as key information to be recorded instead, the recorded game process is independent of logic of the game itself and thereby the technical solution provided by the embodiments of the present invention can be used commonly in varieties of network games.

The forgoing are only preferred embodiments of the present invention, and are not used for limiting the present invention. Any amendments, equivalent substitutions, improvements without deviating from the spirit and scope of the present invention should be included in the protection scoped of the present invention.

What is claimed is:

1. A method for recording and replaying a network game, the method comprising:
    copying all game messages sent by a game server to a game client during a game process, wherein the game messages are generated by the game server in a network environment and in response to game process actions of the game client during the game process and wherein the game client is to use the game messages for depicting the game process; and
    replaying, in the game client, the game process by replaying only the copied game messages in association with the game client sent by the game server to the game client during the game process;
    wherein the game process is only a game process displayed on the game client during the game process;
    wherein replaying, in the game client, the game process comprises,
    creating, in the game client, a virtual interface, wherein the virtual interface simulates an interface between the game server and the game client during the game process,
    sending the copied game messages via the virtual interface to the game client according to a sequence in which the copied game messages are received from the game server, and
    replaying the game process by the game client through executing only the copied game messages sent by the game server to the game client during the game process.

2. The method according to claim 1, wherein sending the copied game messages via the virtual interface to the game client according to a sequence in which the copied game messages are received from the game server comprises:
    sending at an interval, the copied game messages via the virtual interface to the game client according to the sequence in which the copied game messages are received from the game server.

3. The method according to claim 1, further comprising:
    registering a replaying operation of a game recording file in a Register in advance;
    saving the copied game messages as the game recording file; and
    triggering the replaying the game process according to the replaying operation registered in the Register when initiating the game recording file.

* * * * *